United States Patent
Zoninsein et al.

(10) Patent No.: US 11,866,313 B2
(45) Date of Patent: Jan. 9, 2024

(54) AUTOMATED INTEGRATED BEVERAGE SYSTEM

(71) Applicant: Automated Water Machines, Inc., Chicago, IL (US)

(72) Inventors: Manuela S. Zoninsein, Chicago, IL (US); Rituraj Chauhan, Chicago, IL (US)

(73) Assignee: Automated Water Machines, Inc. (fna Kadeya), Chicago, IL (US)

( * ) Notice: Subject to any disclaimer, the term of this patent is extended or adjusted under 35 U.S.C. 154(b) by 0 days.

(21) Appl. No.: 17/740,800

(22) Filed: May 10, 2022

(65) Prior Publication Data

US 2023/0365390 A1    Nov. 16, 2023

(51) Int. Cl.
*B67C 7/00* (2006.01)
*B65G 1/04* (2006.01)
*B67B 3/00* (2006.01)

(52) U.S. Cl.
CPC .......... *B67C 7/0073* (2013.01); *B65G 1/0485* (2013.01); *B67B 3/00* (2013.01)

(58) Field of Classification Search
CPC ....................... B67C 7/0073; B67C 2007/0066
See application file for complete search history.

(56) References Cited

U.S. PATENT DOCUMENTS

| | | | |
|---|---|---|---|
| 6,575,363 B1 | 6/2003 | Leason et al. | |
| 7,083,093 B1 | 8/2006 | Brown | |
| 7,237,577 B1 | 7/2007 | Yacko et al. | |
| 7,963,439 B2 | 6/2011 | Brown | |
| 8,511,105 B2 | 8/2013 | Kamen et al. | |
| 8,807,980 B2 | 8/2014 | Meinzinger et al. | |
| 8,973,822 B2 | 3/2015 | Brown | |
| 9,540,124 B2 | 1/2017 | Petrini | |
| 9,550,662 B1 | 1/2017 | Brown | |
| 9,731,845 B2 | 8/2017 | Petrini | |
| 10,664,571 B2 | 5/2020 | Wernow et al. | |
| 10,726,658 B1 * | 7/2020 | Kim | G07F 9/023 |
| 2006/0037286 A1 * | 2/2006 | Bernhard | F16C 21/00 53/281 |
| 2006/0132311 A1 | 6/2006 | Kruest et al. | |
| 2011/0000923 A1 | 1/2011 | Morales | |
| 2012/0103926 A1 | 5/2012 | Ibsies | |

(Continued)

FOREIGN PATENT DOCUMENTS

| | | |
|---|---|---|
| CA | 2813021 C | 4/2018 |
| EP | 1427640 B1 | 12/2004 |

(Continued)

*Primary Examiner* — Natasha N Campbell
(74) *Attorney, Agent, or Firm* — Nutter McClennen & Fish LLP

(57) ABSTRACT

A dispensing machine has a housing with an interior having a plurality of components. Among others, those components may include a return port accessible from the exterior of the housing and configured to receive containers, a cleaner configured to clean containers received from the return port, and a filler configured to add fluid (e.g., a liquid, such as a beverage) to one or more (clean) containers. In addition, the components also may include a capper configured to cap at least one container, and a dispenser configured to receive at least one capped container filled with fluid. The dispenser is configured to be accessible from the exterior of the housing.

22 Claims, 17 Drawing Sheets

(56) References Cited

U.S. PATENT DOCUMENTS

| | | | |
|---|---|---|---|
| 2015/0329225 A1* | 11/2015 | Moncayo, Jr. | A61L 2/07 |
| | | | 422/26 |
| 2017/0325482 A1* | 11/2017 | Deng | G07F 13/10 |
| 2020/0090446 A1 | 3/2020 | Locke et al. | |
| 2020/0312078 A1* | 10/2020 | Deshpande | A23G 9/28 |
| 2021/0090377 A1 | 3/2021 | Locke et al. | |
| 2022/0172549 A1* | 6/2022 | Chung | G07F 5/00 |
| 2022/0301664 A1* | 9/2022 | Belingon | G16H 10/60 |

FOREIGN PATENT DOCUMENTS

| | | | | |
|---|---|---|---|---|
| EP | 2724325 A1 | 4/2014 | | |
| GB | 2588189 A * | 4/2021 | | A61L 2/07 |
| JP | 2003317144 A | 11/2003 | | |
| WO | 2003020598 A2 | 3/2003 | | |
| WO | 2012174609 A1 | 12/2012 | | |

* cited by examiner

AUTOMATED INTEGRATED BEVERAGE SYSTEM

GOVERNMENT RIGHTS

None

FIELD

Illustrative embodiments of the invention generally relate to dispensing devices and, more particularly, various embodiments of the invention relate to dispensing consumer items from a dispensing machine.

SUMMARY OF VARIOUS EMBODIMENTS

In accordance with one embodiment of the invention, a dispensing machine has a housing with an interior having a plurality of components. Among others, those components include a return port accessible from the exterior of the housing and configured to receive containers, a cleaner configured to clean containers received from the return port, and a filler configured to add fluid (e.g., a liquid, such as a beverage) to one or more (clean) containers. In addition, the components also may include a capper configured to cap at least one container, and a dispenser configured to receive at least one capped container filled with fluid. The dispenser is configured to be accessible from the exterior of the housing.

Within its interior, the dispensing machine also has storage configured to hold at least one container. The storage may be configured to receive clean bottles from the cleaner and be accessible to the filler. The dispensing machine further may have logic configured to store data relating to use of the dispensing machine. That data may include, among other things, data specific to individuals and aggregate data of multiple users. Moreover, illustrative embodiments may be responsive to logic exterior to the housing (e.g., using a SAAS model). To facilitate operation, a user interface may be configured to dispense at least one container in response to user input.

The dispensing machine also may have inspection devices. For example, the dispensing machine can have an incoming inspection system configured to inspect incoming dirty bottles and an outgoing inspections system to inspect outgoing clean bottles to meet prescribed requirements (e.g., regulatory requirements, such as those prescribed by a government agency).

In accordance with other embodiments, a dispensing method receives a container at a return port of a dispensing device having a housing, cleans the container within the housing, and then adds fluid to the container after cleaning the container. The method caps the container after adding fluid to produce a capped container and, after receiving an input request to dispense the capped container, responsively dispenses the capped container.

In preferred embodiments, the method and other methods discussed within this disclosure are at least partially or fully automated—i.e., not requiring human interaction to complete.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below. It should be noted that the figures describe in text and otherwise specific embodiments that are intended as exemplary and are not intended to limit other embodiments.

DESCRIPTION OF ILLUSTRATIVE EMBODIMENTS

In illustrative embodiments, a dispensing machine has integrated systems to automatically receive, clean, fill, and dispense beverage containers within a single unit. More specifically, such embodiments aim for enhanced sustainability by reducing single use bottles, the need for wide distribution of those bottles across wide geographies, in turn helping reduce carbon footprint for the world. The automated and autonomous machine dispenses water in bottles, accepts used bottles, cleans bottles, sanitizes the bottles, stores bottles in clean storage in one self-contained unit. Details of illustrative embodiments are discussed below.

Figure 1:
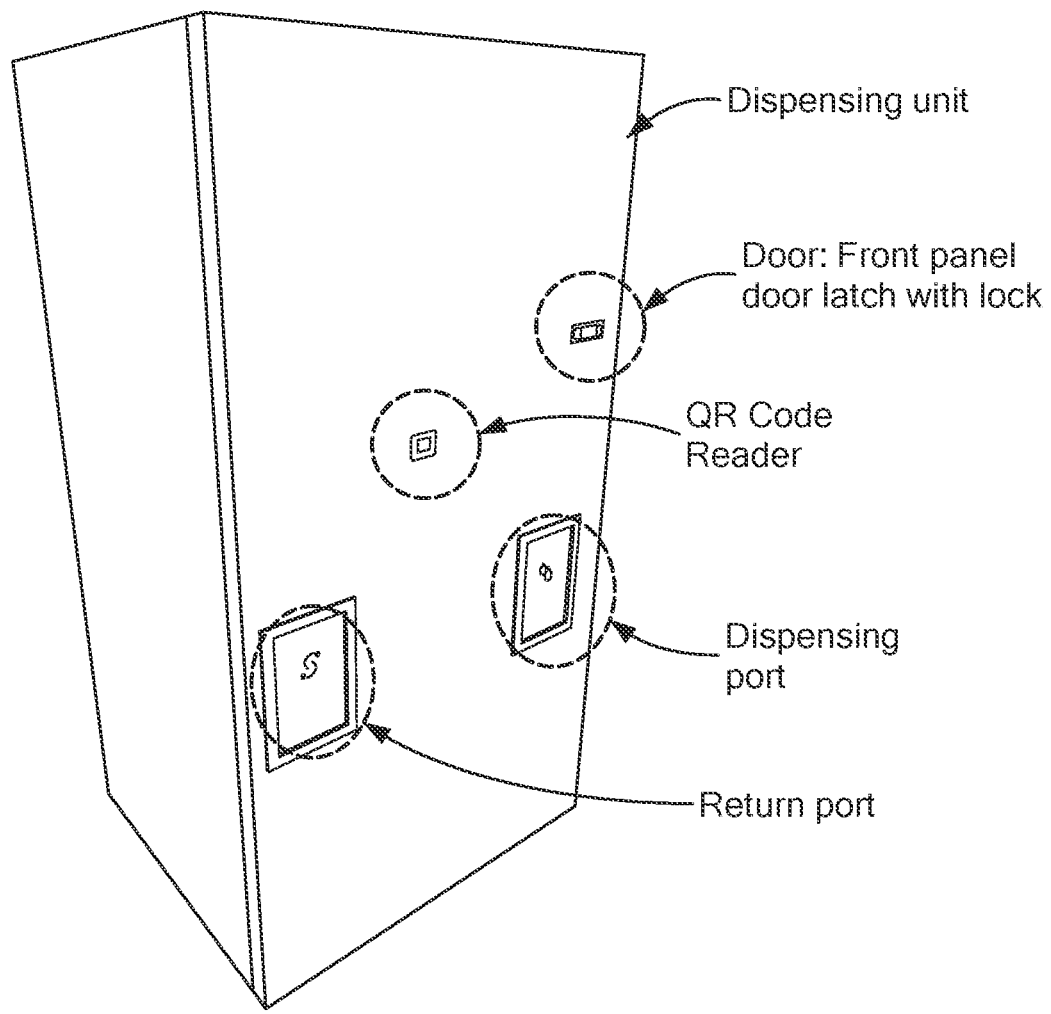
FIG. 1 schematically shows a self-contained dispensing machine configured in accordance with illustrative embodiments.

FIG. 1 schematically shows a self-contained dispensing machine configured in accordance with illustrative embodiments. As shown, the machine has a housing with a door/front panel that can be opened along a hinge. To facilitate use, the machine also has exterior-accessible interface regions. Specifically, the machine has a request input, in the form of a QR code reader in this embodiment, enabling the user to request a bottle of the beverage or initiate some other action. The housing also forms a dispensing port for dispensing bottles, which may scan a unique code, such as a barcode, of a bottle for traceability and then dispense the bottle. In addition, the housing also has a return port for receiving used bottles. For example, after finishing the beverage in a container, the user may deposit the "dirty"

container in the return port for cleaning, storage, filling, capping, etc., and ultimately for use at a later time. The return port may scan a unique code (e.g., a barcode) on the bottle for traceability and move the bottle to dirty bottle storage.

Figure 2:
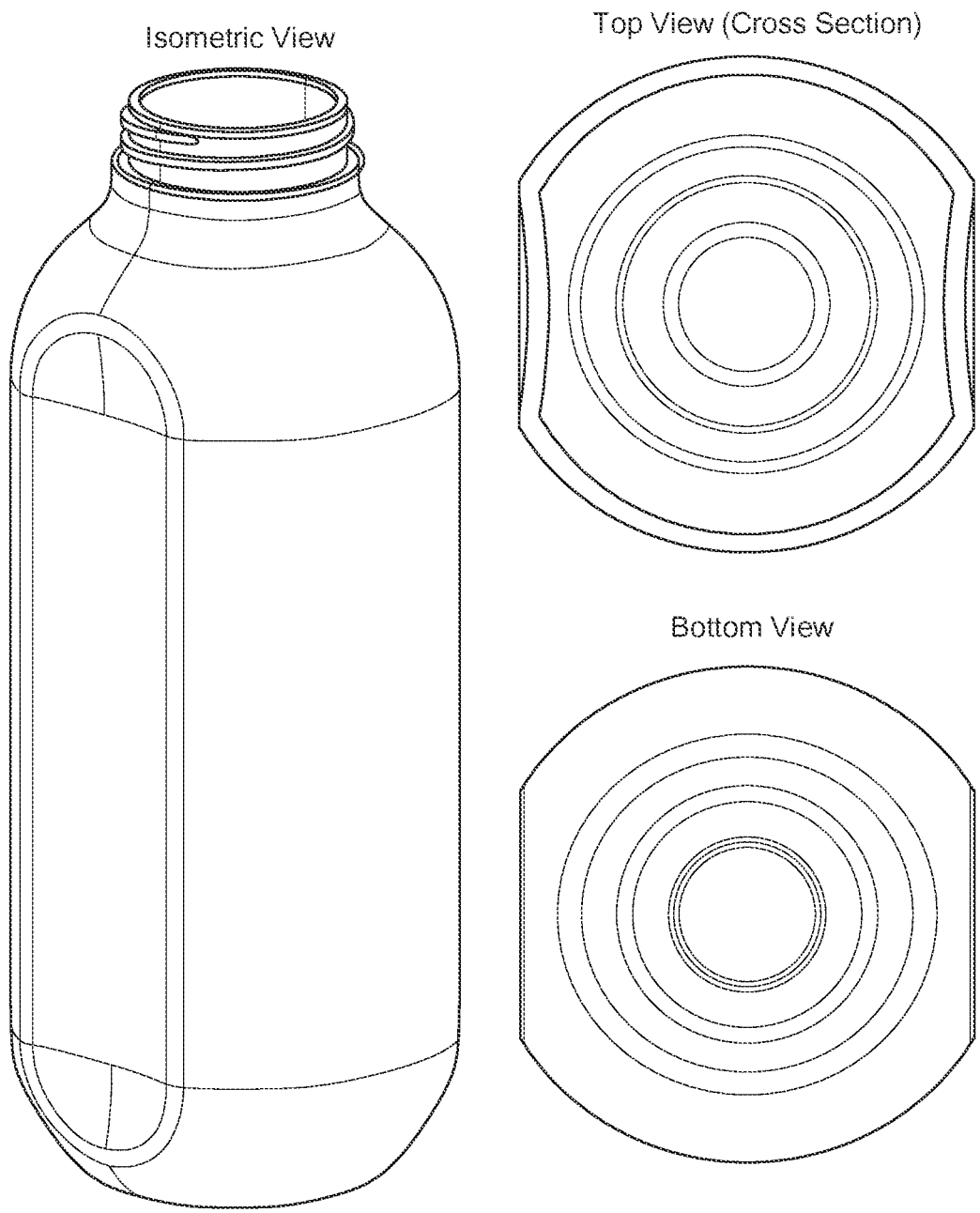
FIG. 2 schematically shows one embodiment of a container that may be used with the dispensing machine of FIG. 1.

More specifically, the machine may have the following functionalities, among others:
  Clean cold bottle storage magazine with mechanism to dispense bottles,
  Dirty bottle storage magazine with mechanism to accept empty dirty bottles,
  Bar code readers or other sensors to read unique barcode or other indicia (e.g. acoustic input or other indicia) during dispense and return of the bottle,
  Dispense (vend) and Return (reverse-vend) capabilities,
  UL compliant enclosure,
  Refrigeration and/or chiller, and
  Compliance with standard vending machine, refrigerator, or other technologies FIG. 2 schematically shows one embodiment of a container (aka "bottle") that may be used with the dispensing machine of FIG. 1. As shown, the bottle has a body with a flat bottom and an open top. Preferably, the bottle is formed from more sustainable material, such as glass, stainless steel, composite, combination of materials, or other material that can withstand repeated use and have one or more of the following attributes:
  A label printed on each bottle,
  A laser etched unique QR code to provide systemwide traceability,
  Features for easier grip and preventing roll off in horizontal orientation (e.g., grooves on two sides, flat surfaces, etc.).

To accomplish its dispensing function with a goal of sustainability, illustrative embodiments have one or more of the following sub-systems within and/or on the housing:
  Storage to hold bottles (e.g., to hold 100-180 clean bottles in a manner so that they do not contact each other)
  A chiller to dispense cold water on demand,
  A carbonization mechanism to add carbonization to water, producing sparkling water,
  A flavoring mechanism with one or more options to flavor water,
  A mineralization mechanism to add minerals to water
  One or more water filters to provide high quality, clean water,
  A dispenser to dispense clean bottles filled with beverage,
  A filler to fill the clean bottles with beverage,
  A return port to receive used/dirty bottles,
  A capper with a bottle cap dispensing module,
  A cleaner to clean returned bottles,
  A sanitizer to sanitize the bottles,
  Incoming inspector to inspect all incoming bottles received by the machine,
  An outgoing Inspection Station to inspect all outgoing bottles to comply with regulations
  A recycle region to store discarded bottles,
  A sensor or other apparatus (e.g., a QR code reader) to receive user input, and
  A screen on the front panel (e.g., an LED display).

In illustrative embodiments, the dispensing machine may be part of an overall suite/system that cooperates with controlling logic. For example, the controlling logic may be cloud intelligence that interacts with the dispensing machine to collect data, control operation and maintenance, etc. User logic may be for use with the user in tracking use and other user parameters, dispensing, etc. Among other ways, such user logic may be implanted at least in part by an application executing on a smartphone, tablet, computer, or other type of hardware and interacts with a service via a SAAS platform.

These and other interactive logic may include one or more of the following attributes:
  Office Manager Web-based user interface ("UI"),
  Consumer/user Web-based UI,
  IOT functionality to communicate between multiple similar dispensing machines managed by the same entity,
  Transfer of machine and usage data from dispensing machines to the cloud,
  Near-real-time alert notification from the dispensing machine to the cloud,
  Well published and secure application programming interface ("API") platform for external integration, and
  Regulatory compliant framework (e.g. complying with SOC 2 and HIPPA standards).

In illustrative embodiments, the dispensing machine user experience starts with the office manager. The office manager registers their company with a service (e.g., the Kadeya service) using an "Office Manager Web-based UI". After the company registers, the office manager or other personnel adds relevant consumers to their respective office. For example, a company have offices in New Hampshire and Florida. Accordingly, that office manager may register employees of their office in New Hampshire with a "NH OFFICE" grouping and their employees of their office in Florida with a "FLORIDA OFFICE" group.

The consumers then preferably will be notified in some conventional manner, such as by a link in an email or a text message on their phone, welcoming them to the service and introduce the users to one or more specific dispensing machines (e.g., the dispensing machines in their local office). Consumers then may click on the link to open the "Consumer Web-based UI" to register themselves. The consumer may use the application to provide pertinent information, such as their preferred beverage selection (e.g., cold vs. room temperature water, still vs. sparking water, favored vs. non-flavored water, soda preferences, etc.). On completion of the consumer registration, each consumer is provided with a unique QR code to access one or more dispensing machines managed by or affiliated with the service.

Figure 3:
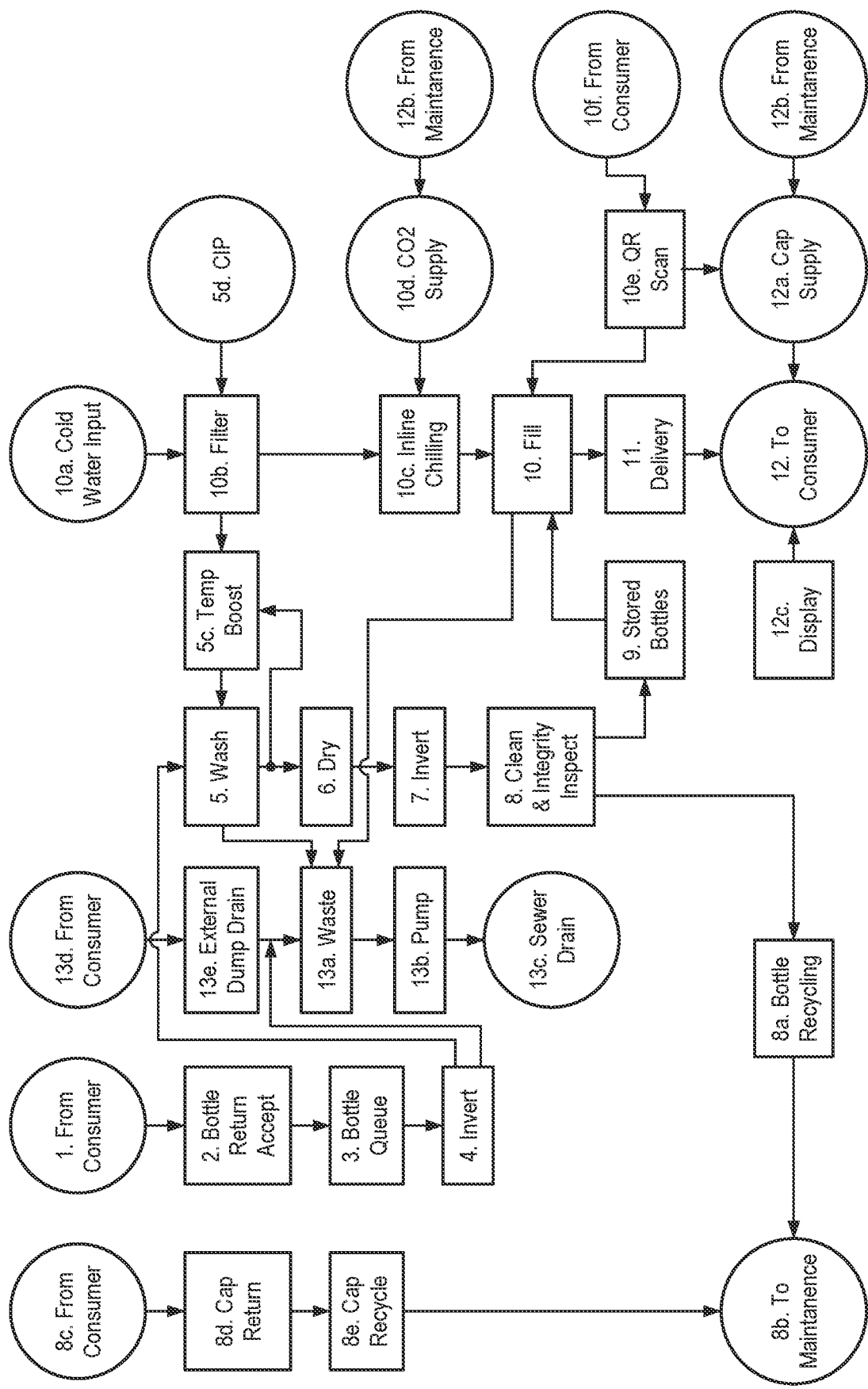
FIG. 3 shows a process used by the dispensing machine of FIG. 1 in accordance with illustrative embodiments.

FIG. 3 shows a process used by the dispensing machine in accordance with illustrative embodiments. To retrieve a filled bottle, the consumer displays the QR code on their phone in front of the dispensing machine QR code reader. The dispensing machine reads the QR code and, on a successful read, obtains a clean bottle (e.g., from its local storage or an unstored and real-time cleaned bottle), scans the QR code of that bottle, and then fills the clean bottle with desired type of water based on the consumer profile. The dispensing machine also dispenses a bottle cap based on consumer profile (e.g., a sealed cap or a cap that has moving parts to be selectively open and closed and yet, remain secured to the bottle opening). If the dispensing machine is unable to read the QR code, the consumer may be informed with appropriate resolution steps on the dispensing machine LED screen, and/or on their phone.

At some point in the future, the consumer may return the bottle to dispensing machine return port. For example, the consumer may return the bottle substantially empty, or still with some remaining fluid. The dispensing machine scans the QR code of the bottle, performs incoming inspection and if the inspection passes, accepts the bottle by moving the bottle from the return port to the internal dirty bottle station. Remaining fluid may be drained. The consumer can then scan their QR code at this time and receive another bottle.

In illustrative embodiments, the dispensing machine has proximity sensor. Accordingly, as the consumer approaches the machine, the QR code reader actives and initiates some indicia (e.g., a blinking light or sound) to let the consumer know that the machine awaits the consumer QR code. A welcome message also may be displayed on the LED screen. After the consumer presents their QR code and the reader successfully reads that code, the machine moves a clean bottle from the clean storage station to the fill station. The machine then scans the QR code of the bottle and saves it with the consumer QR code for traceability. The filler (aka "fill station") then fills the bottle with type of water that matches consumer's preference. In some embodiments, the bottle may be pre-filled and retrieve from storage.

After the bottle is filled, the door to the dispense port opens giving access to the consumer. The machine also dispenses a cap based on consumer profile. After the consumer removes the bottle from the dispense port, the door closes, and the port is disinfected, such as by ultra-violet and/or ozone cleaning process.

After the consumer has consumed the water, they return the empty dirty bottle in the separate return port. The return port sensors detect the bottle. After the empty bottle is detected in the return port, the machine scans the bottle QR code and on successful read, the door to the return port closes and the machine performs incoming inspection of the dirty bottle. The incoming inspection uses one or multiple sensors, such as scale, infra-red, optical sensors, to ensure the bottle is empty of water (if that is a desired property), does not have a cap, void of any large debris, and not broken. If the bottle QR code read fails, the consumer is informed with resolution steps on the LED screen and/or on their phone. If the incoming inspection process fails, the bottle is discarded to the recycle bin internal (or external) to dispensing machine. In that case, the consumer is informed and, if complying with the service's requirements/specifications, allows the consumer to receive a new bottle with beverage.

After successful completion of the incoming inspection, the bottle is moved to the dirty staging area. The dirty staging area buffers some prescribed number of bottles, such as five to ten bottles. When the buffer is filled or reaches some other unfilled capacity, the bottles are moved to the cleaner (aka "cleaning substation"). The cleaning substation is configured to clean in batches, such as batches of five to ten bottles, or individually. The cleaning substation is connected to a hot water reservoir, and the temperature in the reservoir is controlled by sensors and fed by dedicated water heater. A detergent tank connected to the washing substation provides the cleaning agent.

In illustrative embodiments, the bottles are washed with sufficiently hot water (e.g., 180 degrees F.) at a high pressure. To that end, the cleaning process may have multiple stages:
  a first cycle washes bottles with filtered water at room temperature and under high pressure,
  a second cycle washes the bottles with detergents/cleaning agent in hot water at 180 F,
  third and fourth cycles wash the bottles with filtered water at high temperatures and pressure.

After completing the 4-stage washing process, the bottles may be moved to the sanitizer (aka "sanitization substation"). The sanitization substation uses sanitization chemicals (e.g., liquid ozone or other sanitizer) with water at 180 F temperature to disinfect the bottle to meet regulatory requirements. The bottles then may be moved to the outgoing inspection station on completion of the sanitization phase. The outgoing inspection preferably uses a high-definition camera within a well illuminated chamber to detect bottle flaws and/or impurities. The bottle may be rotated on multiple axes and several pictures taken by the camera. Some or all of the resulting data may be processed by onboard artificial intelligence ("AI") or other logic to analyze the data and provide a "go-no-go" status for each bottle. As noted, if a defect and/or impurities are detected, then the bottle is discarded to the relevant recycle bin for future processing by the service's support team. After passing outgoing inspection, the bottles then will be moved to the clean storage area for dispensing. The clean storage area preferably is maintained under strict conditions of temperature, humidity, and air quality to maintain the integrity of the sanitized bottles The unitary, self-contained dispensing machine therefore has an automated self-cleaning process to clean with high temperature and sanitizing chemicals based on regulatory requirements of each location. Moreover, as noted above, the dispensing and return ports preferably are sanitized by ultra-violet light after each dispense and return of the bottle.

As noted above, after detection of consumer QR code, the QR code is read and processed. If successful, one bottle is moved from the clean storage cabinet to the beverage dispensing station with the door closed. The bottle is filled with the right type of beverage based on the user profile, and the bottle QR code is read for traceability. The cap dispenser dispenses the cap based on the user profile. The door to dispensing port opens for consumer to retrieve the bottle. A video may be played on the LCD display to the consumer showing each step from QR code read to bottle being dispensed in a short time—e.g., between 2-10 seconds after a successful QR code read. Other embodiments may have stored containers that already are filled with beverage and capped. In those embodiments, it may be a simple process to dispense the container in a very short time, such as those times taken for conventional beverage dispensing machines.

Figure 4:
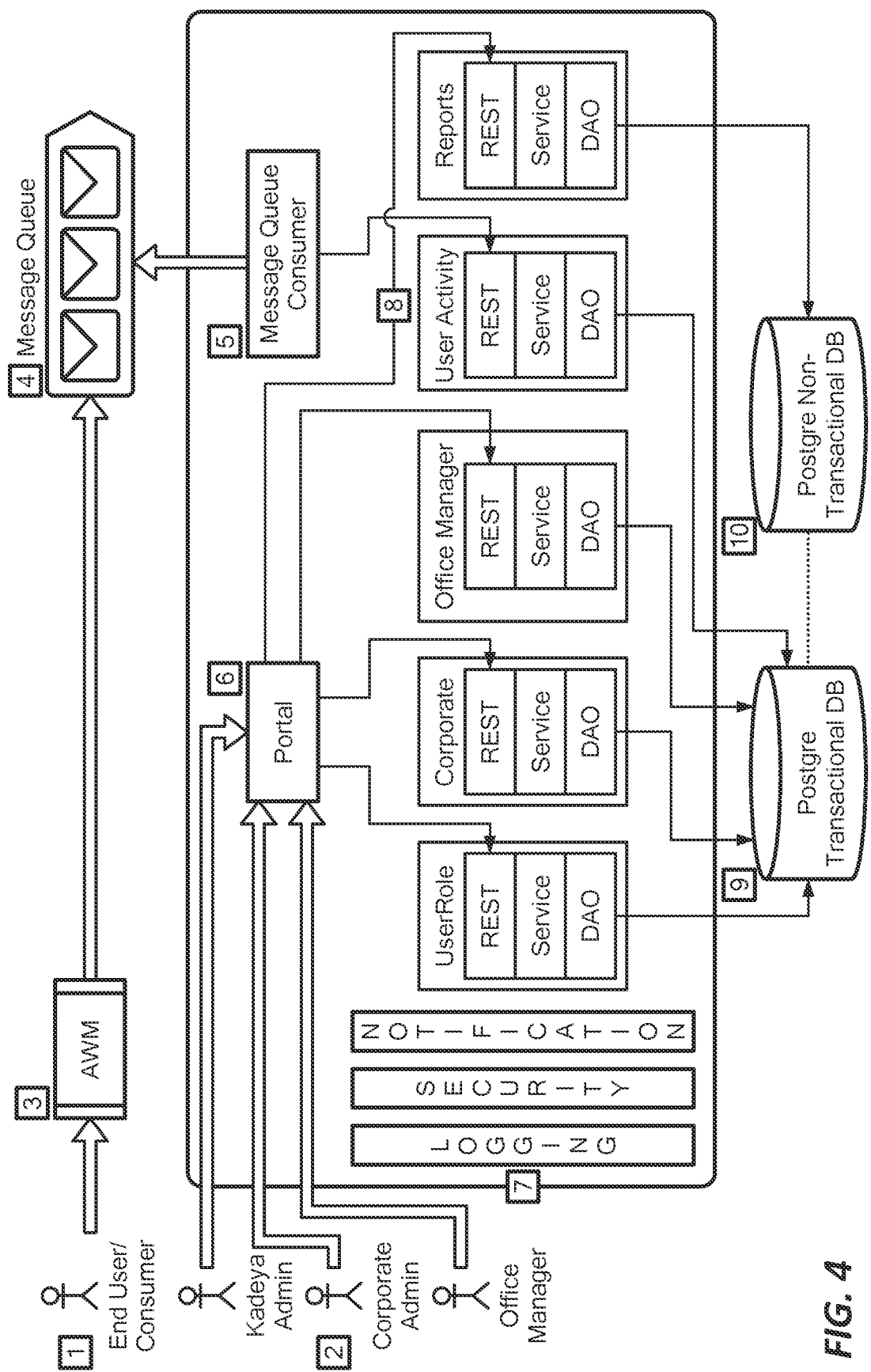
FIG. 4 schematically shows one software implementation in accordance with various embodiments.

Also with regard to FIG. 3, in some embodiments, the process has the following steps:
1. Consumer returns empty dirty bottle in the return port of machine,
2. Machine inspects and accepts the bottle by moving the bottle from return port to internal dirty storage,
3. Machine moves the bottle in the dirty bottle queue,
4. Machine inverts the bottle for washing and sanitization,
Wash substation washes bottle in 4 cycles:
  first cycle washes bottles with filtered water at room temperature and under high pressure,
  in the second cycle the bottles are washed with hot water at 180 F and detergents,
  third and fourth cycle the bottles are washed with filtered water at high temperatures and pressure,
6. Dry substation uses drying agent to dry bottles,
7. Machine inverts the bottle for final inspection,
8. Final inspection station uses multiple sensors to detect bottle defects and/or contamination, on failure:
  8a: the bottles are moved to recycle bin,
  8b: Kadeya maintenance inspect, and process recycle bin for used bottles and caps,
  8c: Consumer returns the used cap,
  8d: Machine has cap port to store used caps,
  8e: Machine moves used caps to recycle bin,
9. On passing final inspection, the bottles are moved to clean storage station,
10. Fill substation,
  10a: Cold water input from municipality water supply,
  10b: Water is processed through multiple water filters,
  10c: Water chiller chills the water on demand, 10d: Carbonation subsystem carbonates water on demand based on consumer preference,
10e: QR code reader auto detects presence of QR code,
10f: Consumer displays QR code on their smartphone,
11. On successful scan of QR code the machine dispenses clean filled chilled bottle in the dispense port,
12. Door opens for consumer to retrieve the bottle,
12a: Machine provides cap from cap cartridge,
12b: Kadeya maintenance fill cap cartridge on regular maintenance cycle, As noted above, illustrative embodiments use a software architecture with a SAAS model (e.g., in the Amazon Web Services ("AWS")cloud). FIG. 4 schematically shows one implementation in accordance with various embodiments. Among other things, that architecture may involve one or more of the following:

- dispensing machine software is SAAS based architecture deployed in AWS cloud
- architecture based on micro-services and with guaranteed delivery mechanism,
  - dispensing machine messages processed by a message queue on the cloud to provide (preferably) secure, scalable, and guaranteed delivery,
  - two types of messages: Alert & Notifications sent on near-real-time basis and the usage data sent on periodic intervals,
- consumers interact with service software by accessing a web portal hosted in the cloud on a smart phone or laptop,
- data storage (e.g., in the cloud or locally) with regulatory compliance standards, such as SOC2 and HIPPA compliance,
  - secure data transit as well at rest, with SPII data is encrypted.

In some embodiments, with regard to FIG. 4, the high-level architecture may be configured as follows:

1. Consumers interact with machine ("AWM") by multiple methods, displaying QR code on their respective smart phone, speech recognition and or entering their ID on the LED panel Infront of the AWM.
2. There will be 3 types of admin users: Admin user, Corporate Admin user and Office Admin user with different functionality.
3. AWM will communicate to web-services hosted in AWS via Wi-Fi or LAN or cellular communication.
4. A Messaging Queue software will be implemented on AWS to guarantee delivery of messages from AWM to backend system.
5. Message Queue will be supported by a multi-tenant RESTful micro web services.
6. Each type of admin user will have their own software portal-web site.
7. Security, Logging, and notification services will be implemented across all components of the architecture.
8. All transaction will be managed by scalable and secure multi-tenant RESTful micro web services.
9. All data from AWS and consumer input will be stored on a PostgreSQL Transactional production database.
10. On a well-defined time, interval data will be copied into the PostgreSQL Datawarehouse database for reporting, dashboards and BI analytics.

Figure 5:
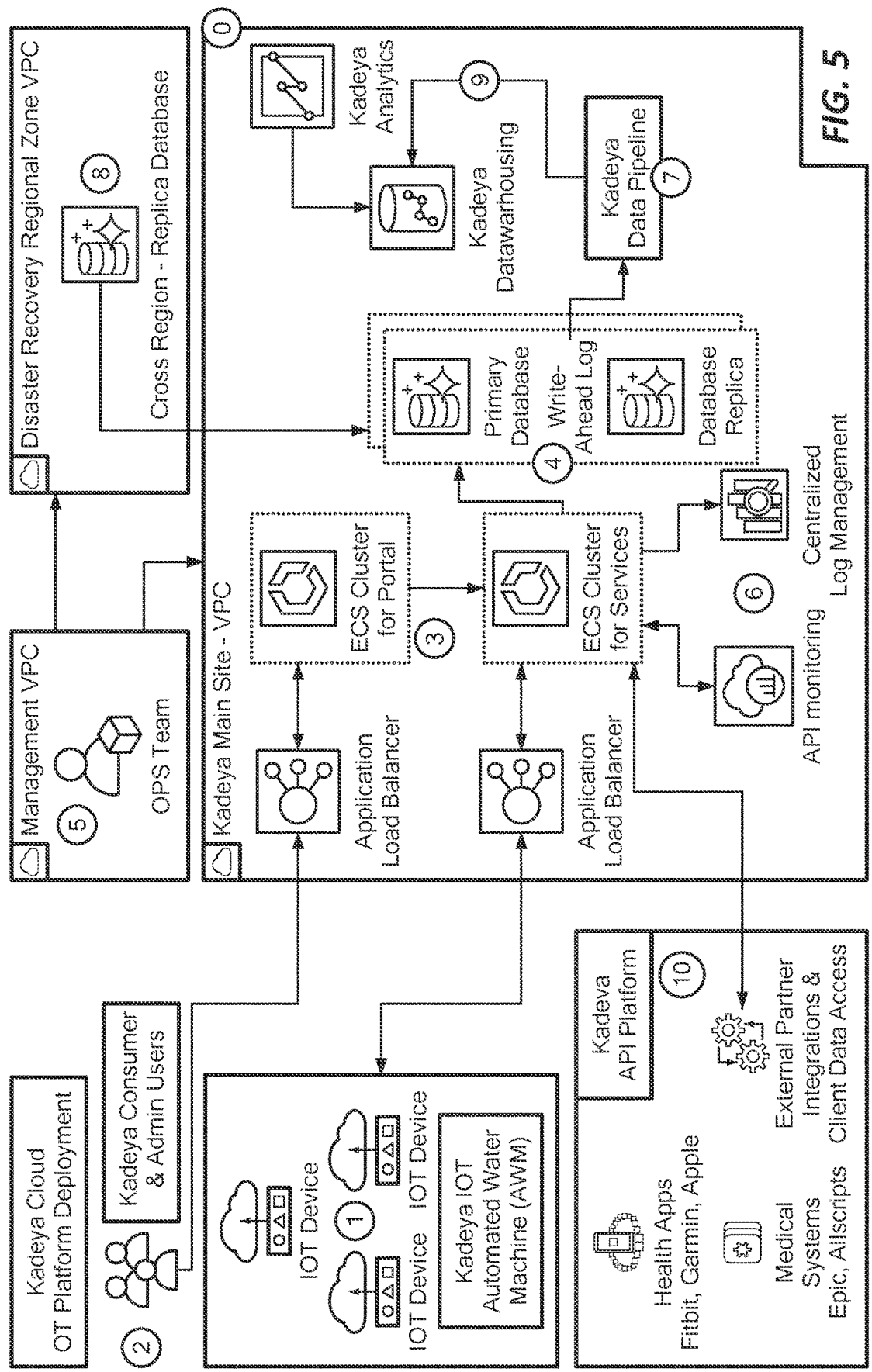
FIG. 5 schematically shows additional relevant details of the wide spectrum of connectivity.

FIG. 5 schematically shows additional relevant details of a software deployment architecture configured in accordance with illustrative embodiments. To that end, in this example:

0. All software components will be part of a Virtual Private Cloud (VPC), such as the AWS virtual private cloud.
1. IOT AWM will communicate to the software hosted in AWS cloud with load balancer for scalability and reliability.
2. Consumer and Administrative users will use web portal to access functionality all transactions would be governed by the load balancer.
3. All microservices will be deployed on AWS cluster of Elastic Container Services (ECS).
4. There will be 2 databases: one for production transaction and the second for designed for Datawarehouse analytics.
5. AWS Management application will be used to manage all aspects of AWS Virtual Private Cloud (VPC).
6. Log management and API management will be utilized to monitor and enhance performance as well as security of the system.
7. Data will be replicated to Datawarehouse database via data pipeline.
8. AWS cross-regional Disaster & Recovery model would be implemented to secure and safeguard data.
9. Datawarehouse database will be used for analytics and dashboards.
10. A well published and secure API platform will be built to interface to external systems.

Figure 6:
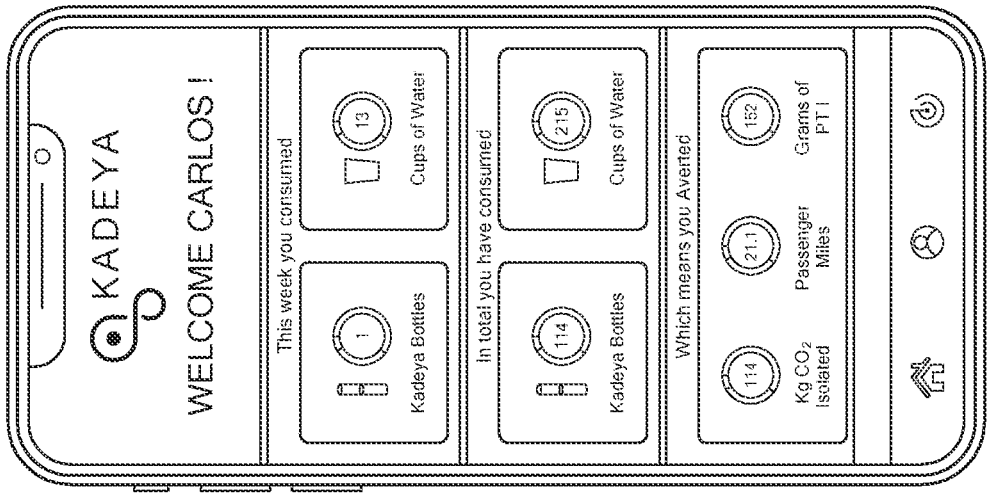
FIGS. 6-8 show various embodiments of consumer screens.
Figure 6:
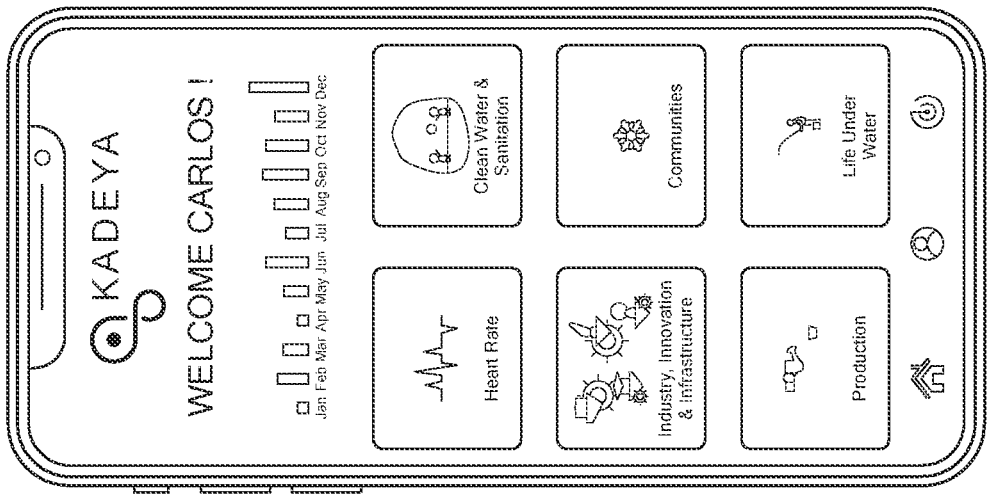
Figure 6:
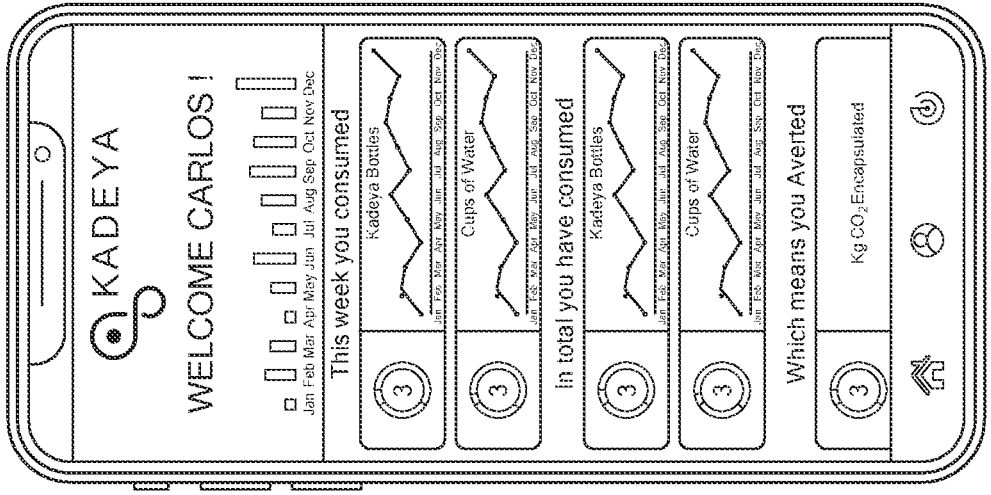
Figure 7:
Figure 8:
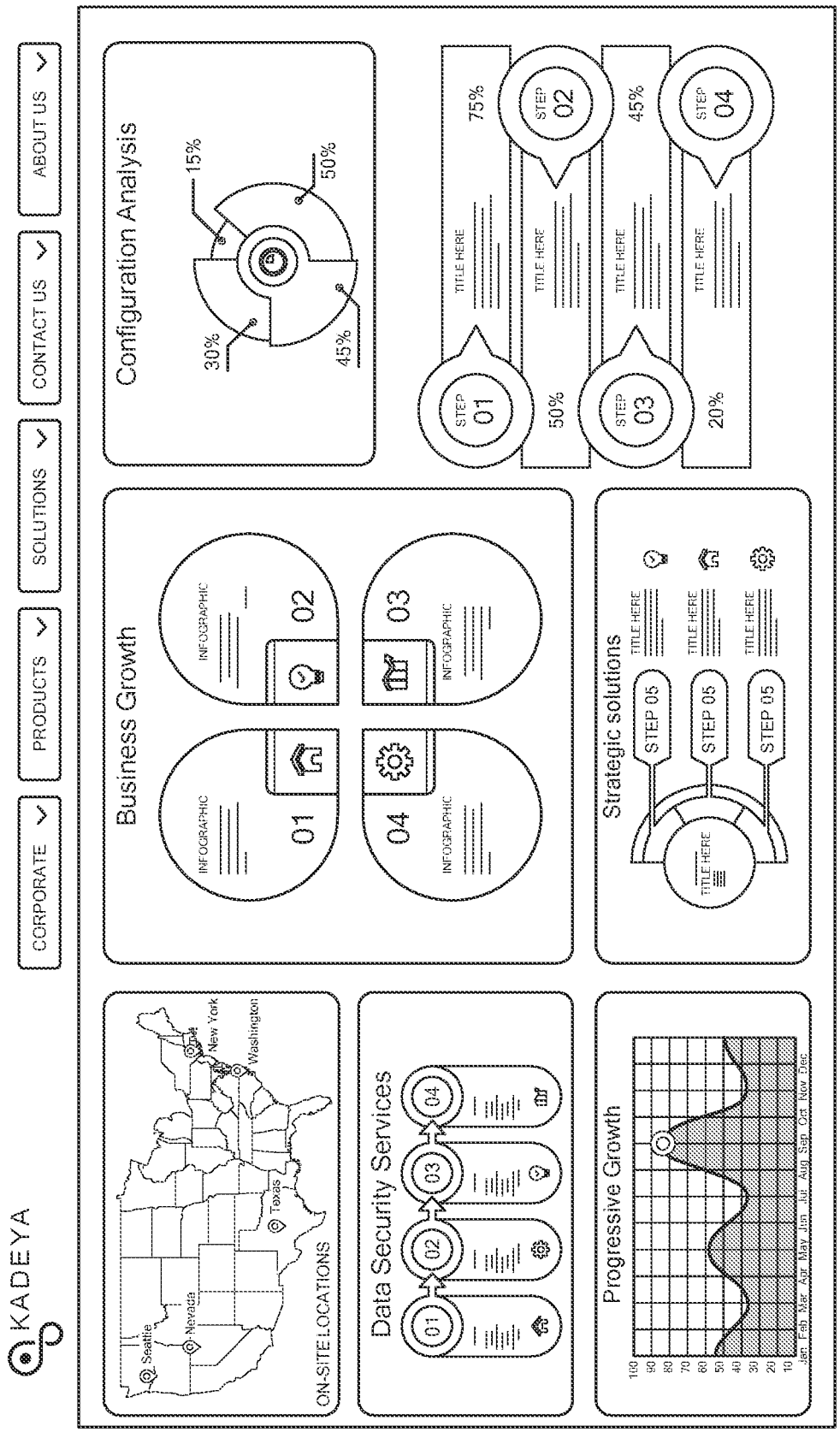

FIGS. 6-8 show various embodiments of consumer screens. For example, these screens may enable a consumer to easily set and track their metrics on total number of bottles of water consumed, number of plastic bottles saved, the carbon footprint savings, etc. More specifically, in some embodiments, these interfaces may be implemented with an easy-to-use web application created for consumers to accomplish the following tasks:

- Set targets by individual on amount of water to drink during a given time (e.g., by day, week, or month),
- Set targets on carbon footprint savings by individual (e.g., by week, month, or year),
- Easy to use dashboard to display the status on all key metrics,
- Ability to share data with friends, family, or others.

Figure 9:
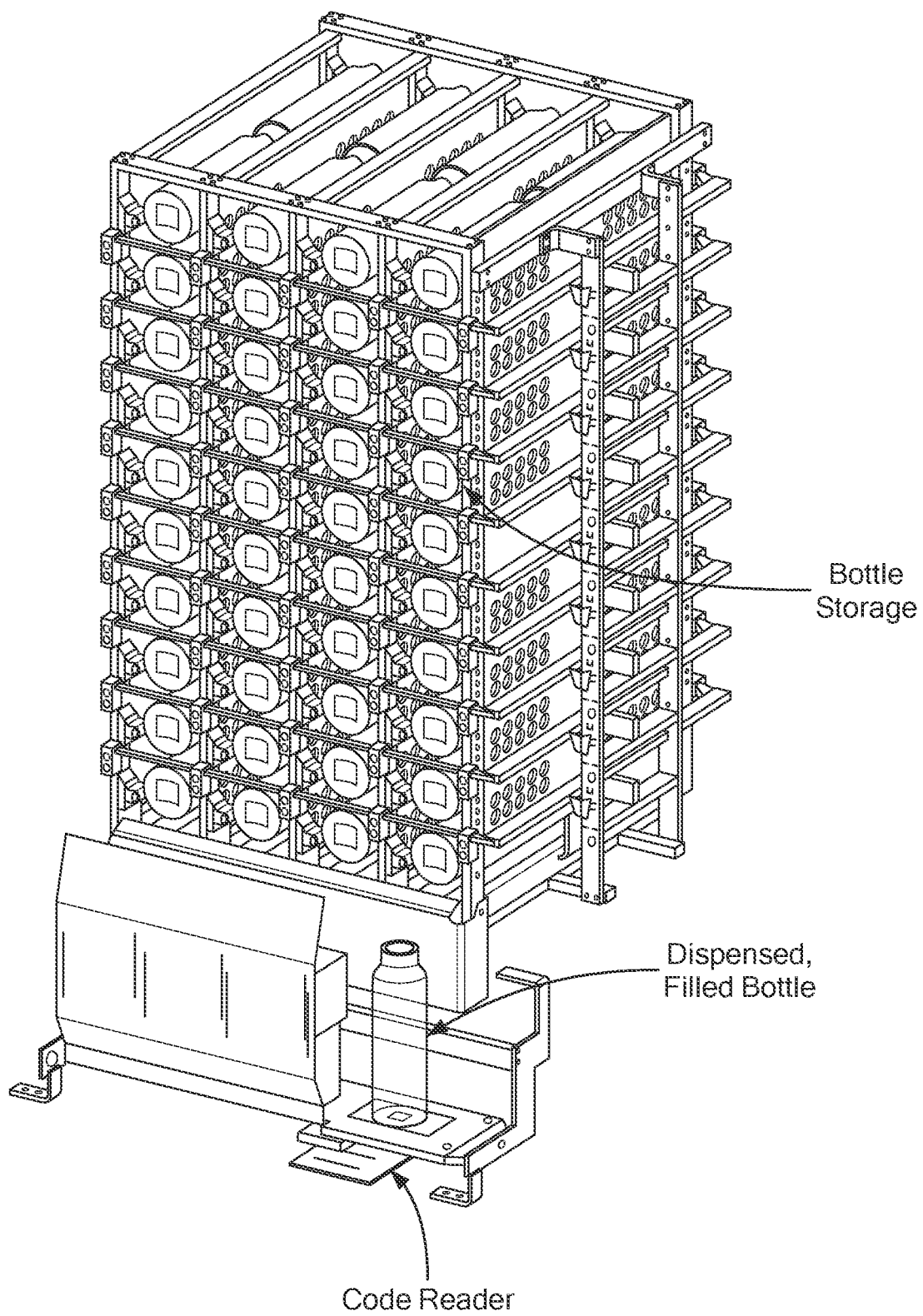
FIGS. 9 and 10 schematically show a bottle storage and dispense mechanism configured in accordance with illustrative embodiments.
Figure 10:
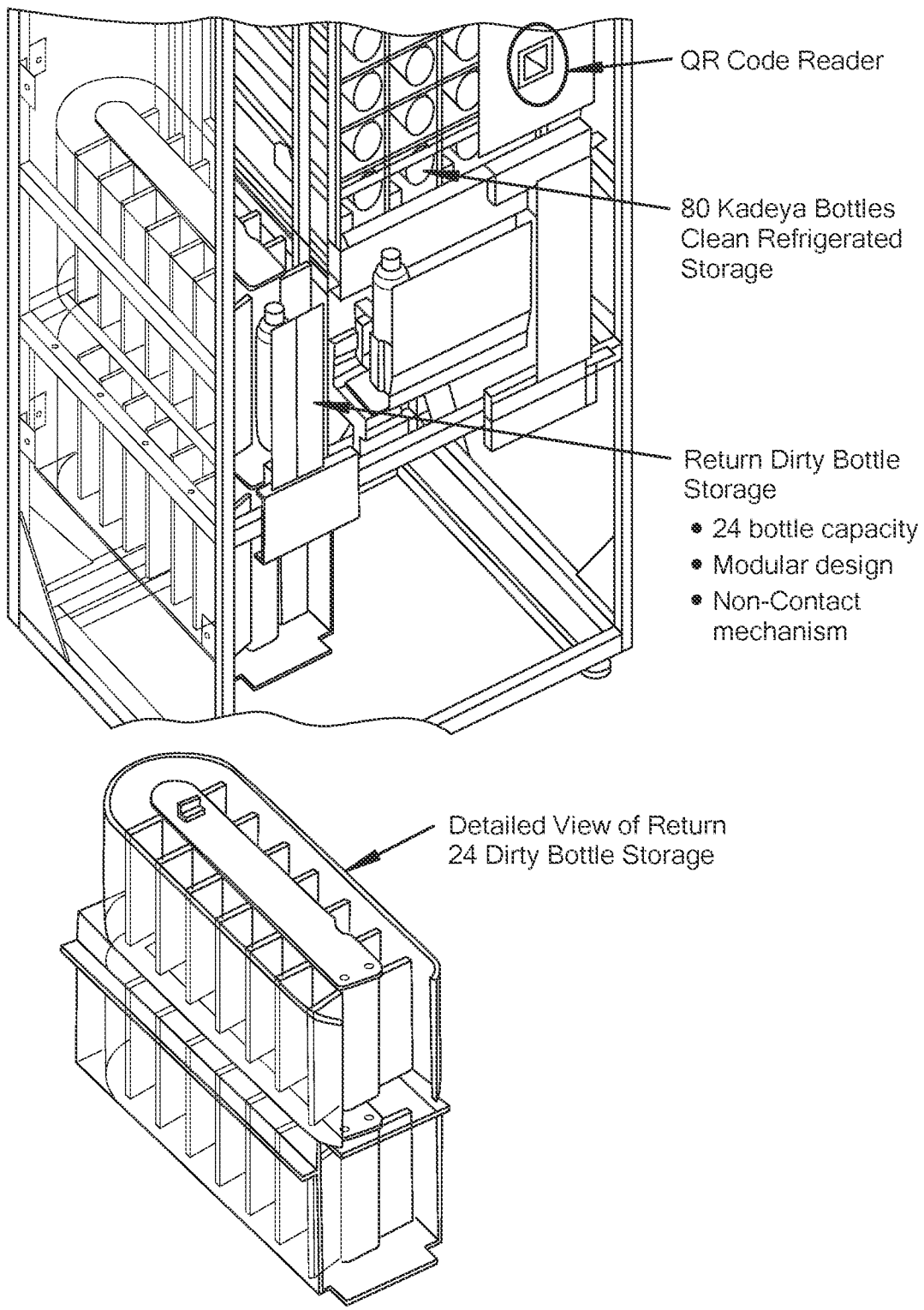

FIGS. 9 and 10 schematically show a bottle storage and dispense mechanism configured in accordance with illustrative embodiments. In illustrative embodiments, this component has a bottle storage portion for containing 60-100 (e.g., 80) clean, refrigerated bottles. The bottle storage can have some or all of the following attributes:

- non-contact bottle transport in the unit (i.e., the bottles do not contact each other when stored),
- bottles are dispensed sequentially from the bottom row, and then the next row drops into place,
- one or more flavors/additives are possible using, for example, independent column control,
- modular components to use other similar commercial, off the shelf or custom bottles,
- 3~4 second dispense time.

FIG. 9 also shows a dispensed bottle with a beverage inside, such as chilled, high-quality water, and a barcode reader to read unique barcodes on each dispensed bottle for traceability and management. FIG. 10 schematically shows dirty bottle return and dirty bottle storage.

Figure 11:
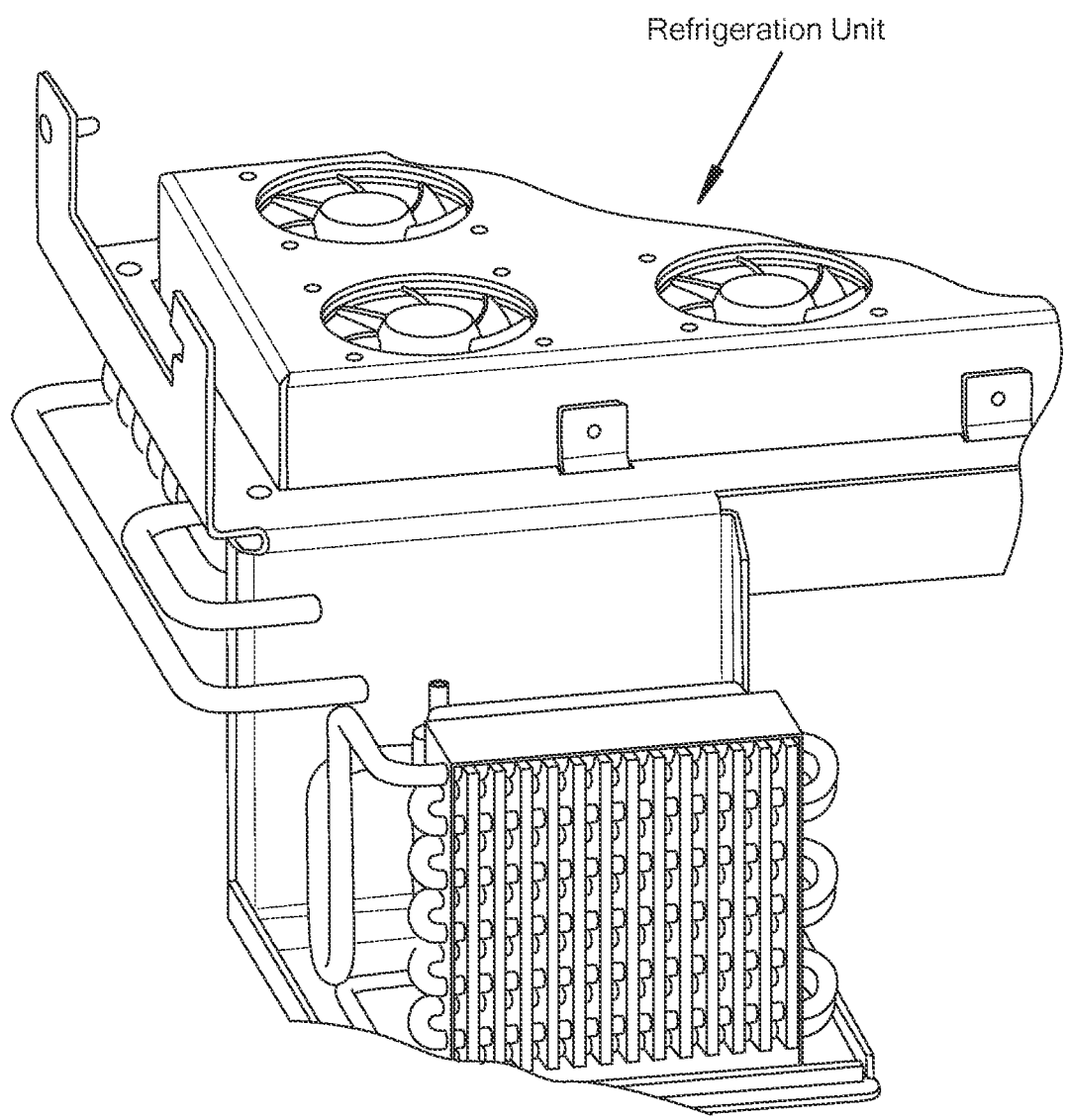
FIG. 11 schematically shows a refrigeration unit that may be used in illustrative embodiments.

FIG. 11 schematically shows a refrigeration unit that may be used in illustrative embodiments. As shown in the figure, by way of example, the unit may have one or more of the following operating parameters/attributes:

High Pressure 21.5 kgf/cm2 (306 psi),

Low Pressure 5.75 kgf/cm2 (81.8 psi) nominal,
Refrigerant 134a,
24 VDC at 6.3 A max,
Other than cooling system all motors and controls at 12 VDC.

Figure 12:
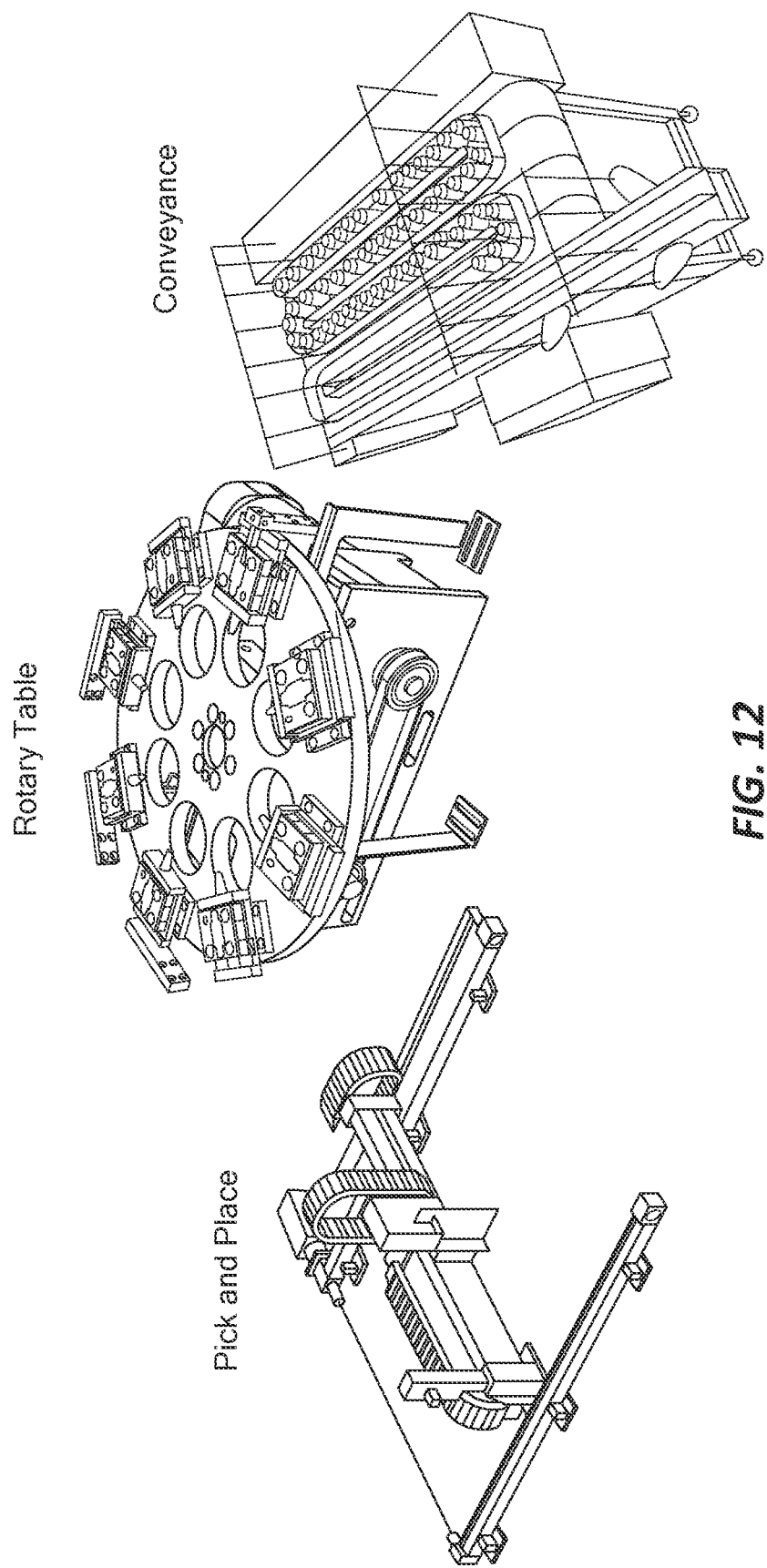
FIG. 12 schematically shows several examples of various bottle transport options in accordance with illustrative embodiments.

FIG. 12 schematically shows several examples of various bottle transport options in accordance with illustrative embodiments. Those skilled in the art can select a mechanism based on the teachings of this disclosure and needs of the given application. The device on the left is a "pick and place" approach, in which bottles are essentially in a fixed position rack and transported to that position by known pick and place technology. The middle concept, a rotary table, loads bottles onto a rotary table to move between specified stations. The third, right-hand approach, conveyance, moves bottles through wash on a conveyor. This approach may stop during wash or other times, or move continuously through the wash.

Figure 13:
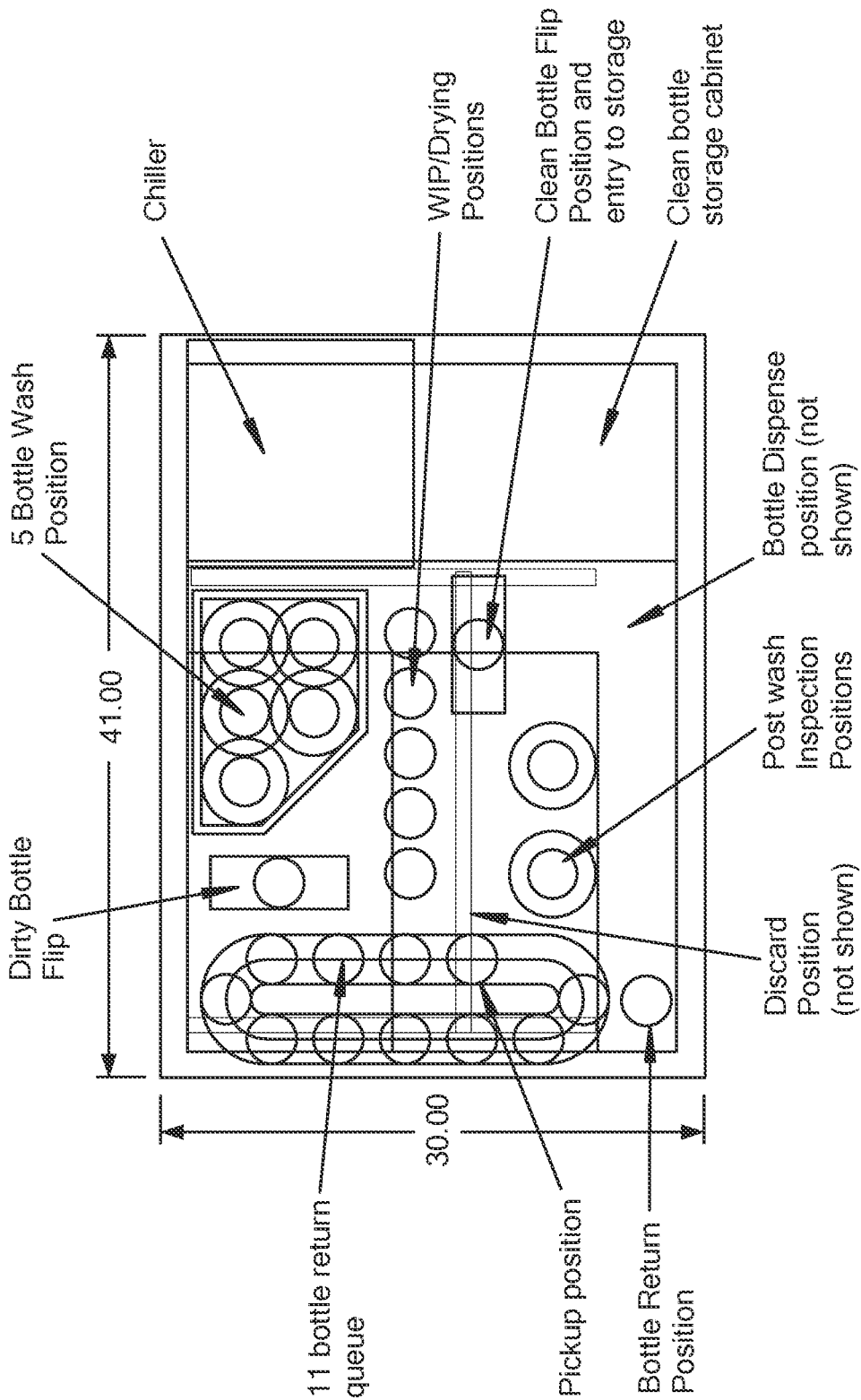
FIG. 13 schematically shows a layout for a washing component in accordance with illustrative embodiments.

FIG. 13 schematically shows a layout for a washing component in accordance with illustrative embodiments. As shown the washing component may be rectangular (e.g., 41.0 inches by 30.0 inches). Of course, other shapes and sizes may suffice. Among other things, this view shows a queue for the bottle return and pickup position, as well as inspection and dispense positions. Further, this figure also shows a chiller, clean bottle storage, drying positions, and clean bottle flip position and entry to storage.

Figure 14:
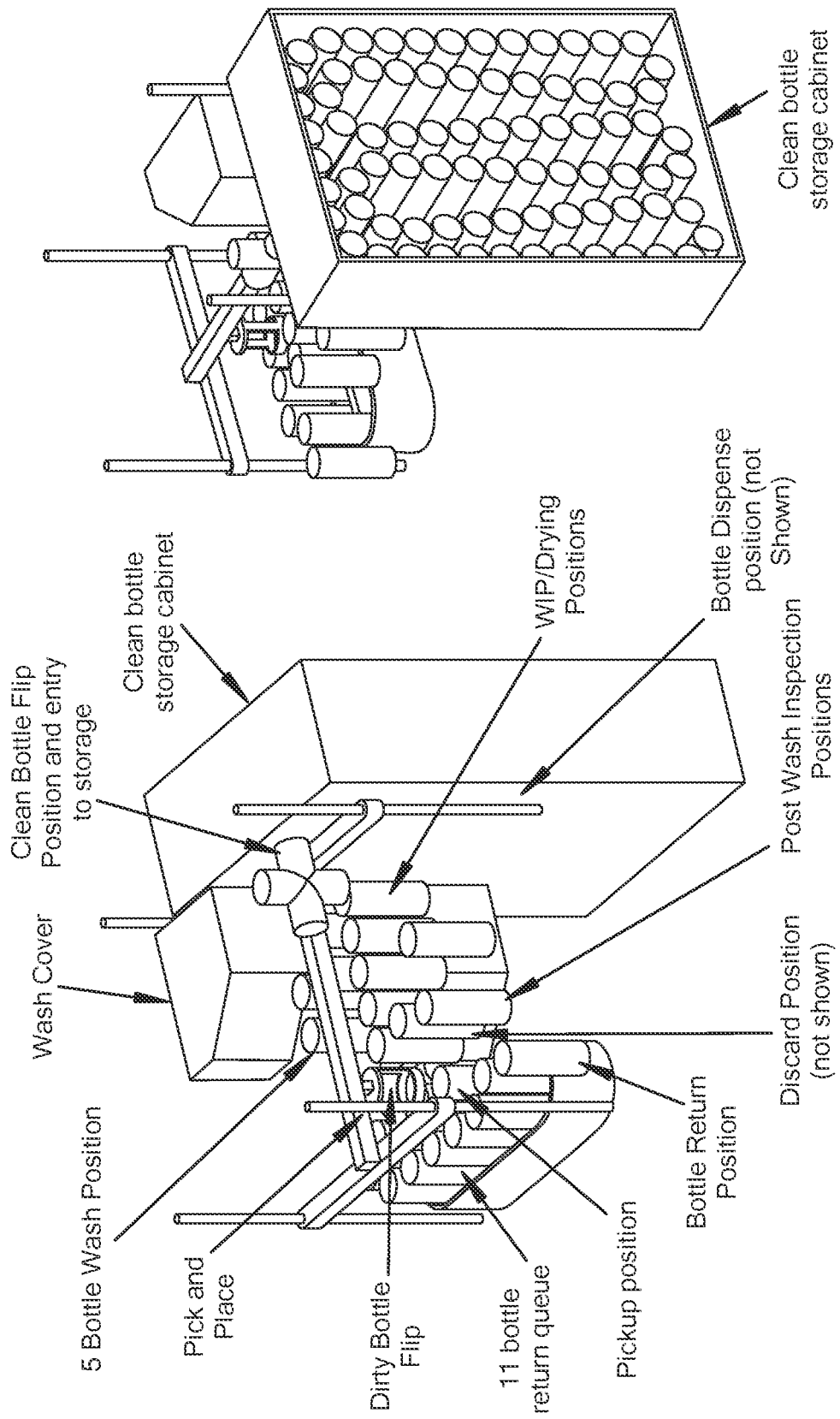
FIG. 14 schematically shows additional details of the pick and place option with bottle wash information in accordance with illustrative embodiments.
Figure 15:
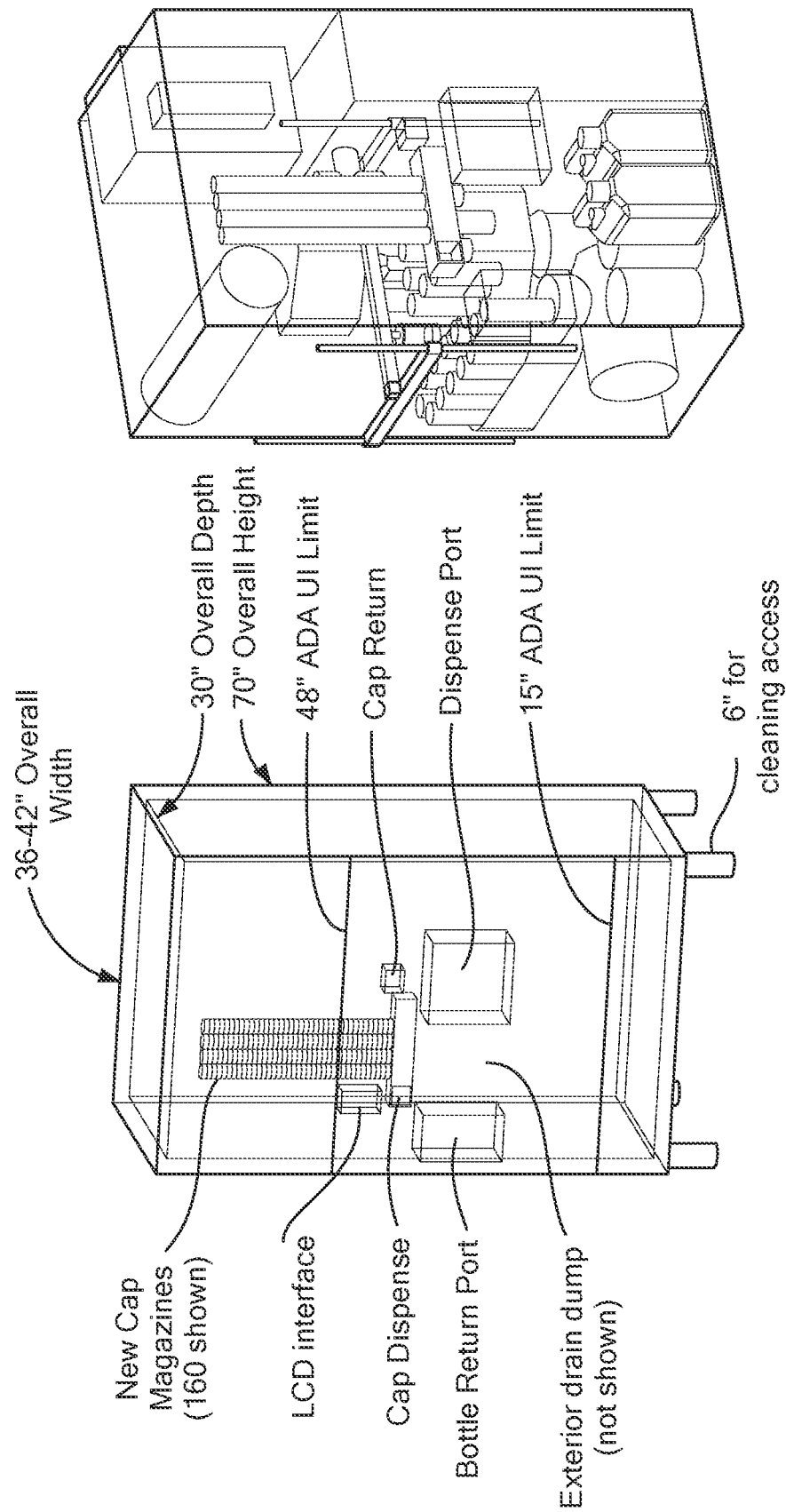
FIG. 15 schematically shows additional details of the AWM in accordance with illustrative embodiments.

FIG. 14 schematically shows additional details of the pick and place option with bottle wash information in accordance with illustrative embodiments. The parts shown on prior figures are shown here as yet another option and view. FIG. 15 schematically shows additional details of the AWM in accordance with illustrative embodiments. This view shows cap dispensers, LED interface and a variety of other components.

Figure 16:
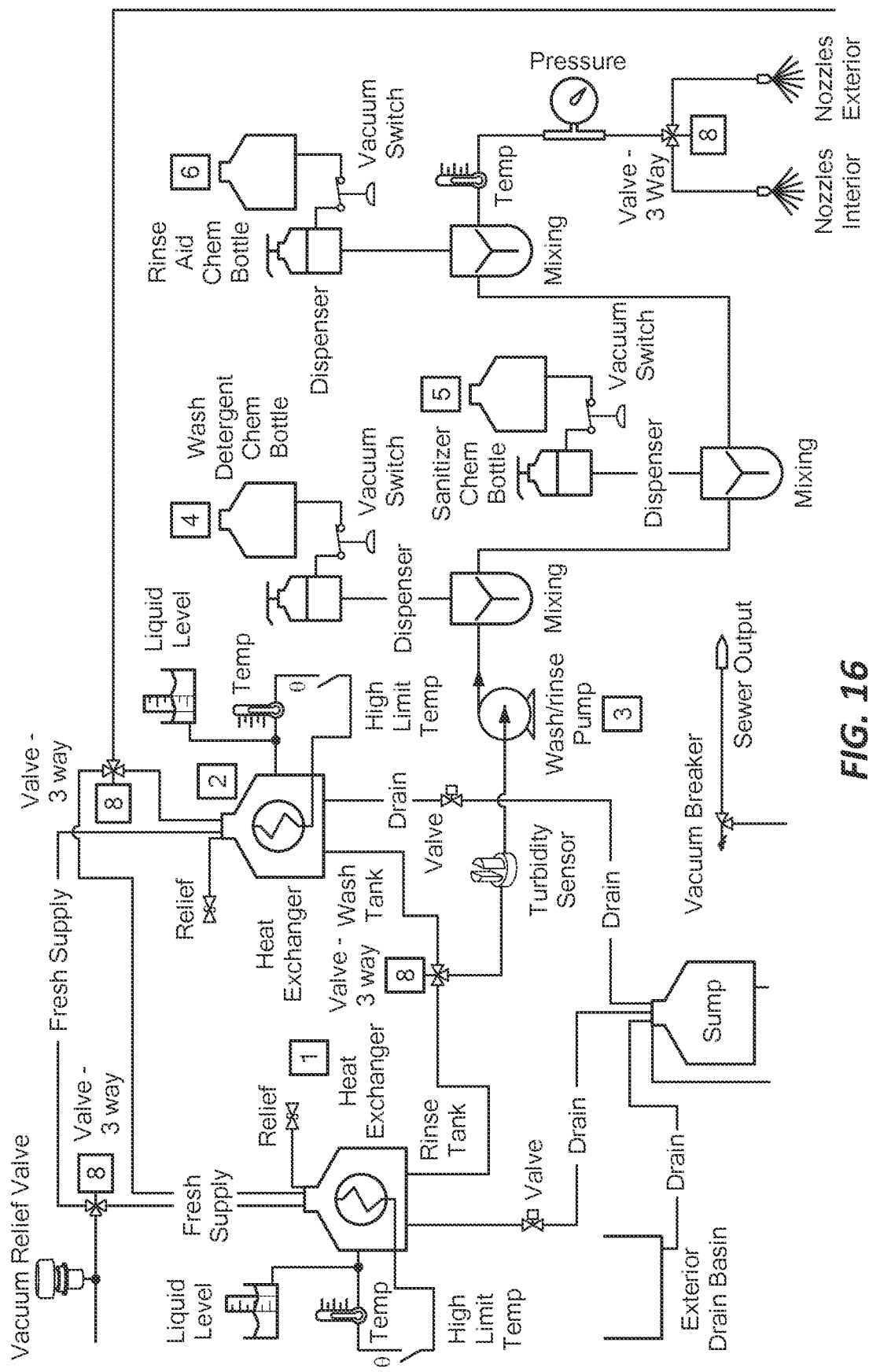
FIG. 16 schematically shows a water and sanitization workflow in accordance with illustrative embodiments.

FIG. 16 schematically shows a water and sanitization workflow in accordance with illustrative embodiments. Among other ways, this workflow may proceed as follows:
1. Store fresh municipality water in a rinse tank to perform an initial rinse cycle of dirty bottles. Also, the process may heat the water to 100 to 110 F as pre-step for wash tank.
2. The wash tank increases the temperature to 170 to 180 F to wash and sanitize the dirty bottles.
3. Washing detergent is used to wash dirty bottles.
4. Preferably using eco-friendly chemicals, the workflow then sanitizes the bottles after the final wash.
5. A rinse aid chemical preferably then is used to optimize drying to lower power consumption.

Figure 17:
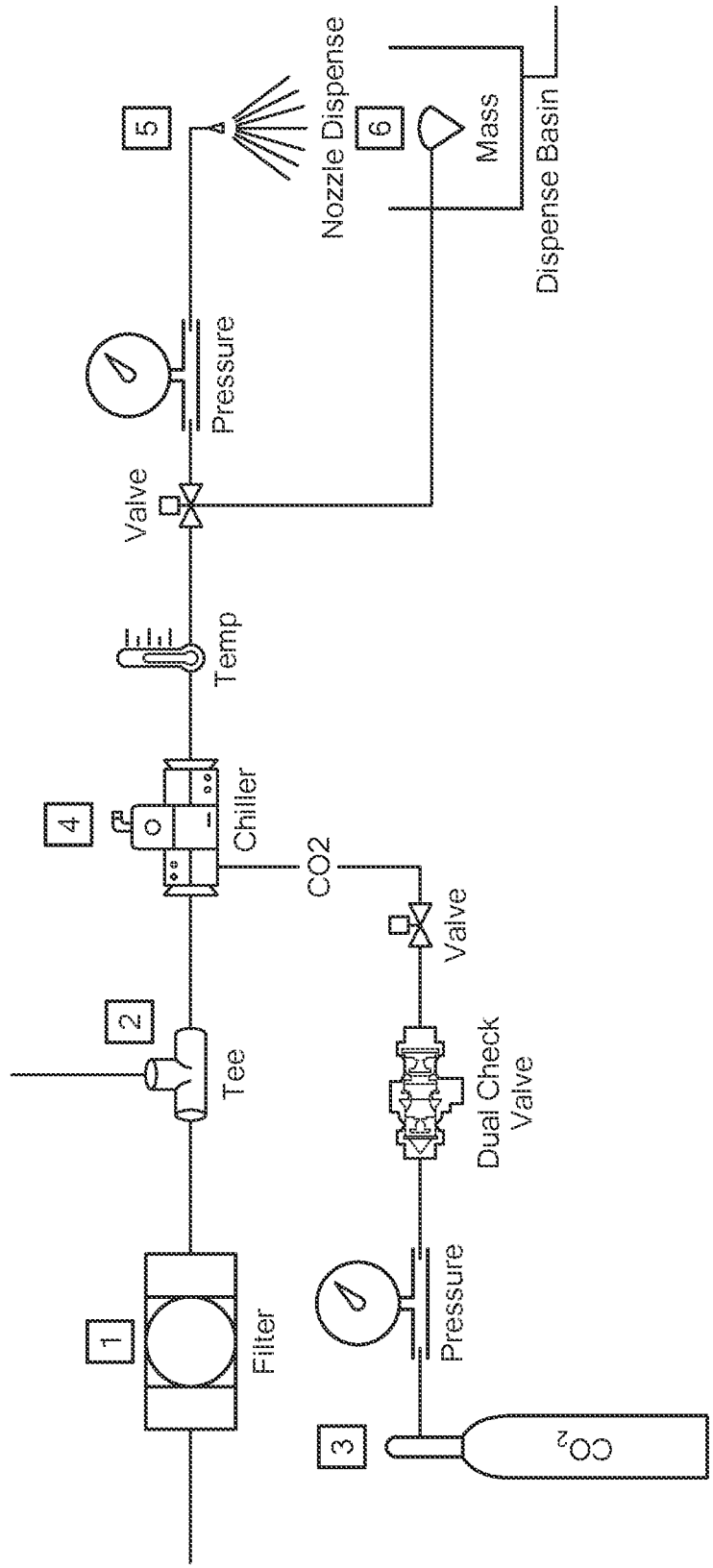
FIG. 17 schematically shows a workflow for the fill station in accordance with illustrative embodiments.

FIG. 17 schematically shows a workflow for the fill station in accordance with illustrative embodiments. Among other things, this workflow may practice one or more of the following steps:
1. Water is filtered using a water filtering mechanism, such as a multi-filter mechanism, to enhance the municipality water quality.
2. A tee connector provides filtered water to the washing subsystem, as well as the fill station.
3. A carbon dioxide source/cylinder in the machine can provide carbonated water as one of the beverage options.
4. The chiller provides chilled or room temperature water.
5. An internal nozzle fills the bottle without exposing the beverage to external elements.
6. Water will be measured during the fill and/or a scale be used to verify the bottle weight before dispensing.

It should be noted that various figures only schematically show components of various embodiments. Those skilled in the art should understand that each of these components can be implemented in a variety of conventional manners, such as by using hardware, software, or a combination of hardware and software, across one or more other functional components. For example, some components may be implemented on a system, and/or using a plurality of microprocessors executing firmware. As another example, some components may be implemented using one or more application specific integrated circuits (i.e., "ASICs") and related software, or a combination of ASICs, discrete electronic components (e.g., transistors), and microprocessors. Accordingly, the representation of components in various figures is for simplicity purposes only. In fact, in some embodiments, some component s may be distributed across a plurality of different devices (e.g., within the dispensing machine).

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components. Some embodiments are formed as firmware, user experience/user interface software, backend (e.g., micro-web services and database.)

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., USB-key, solid-state drive). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies, and/or Internet of Things (IOT) protocols, WiFi, LAN, and cellular.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. This disclosure should be considered to encompass combinations of one or more of any of the below claims.

What is claimed is:

1. A dispensing machine comprising:
a housing having an interior and exterior;
a return port accessible from the exterior of the housing and configured to receive containers;
an inspection system comprising at least one sensor and logic, configured to produce multiple camera images around the containers to inspect incoming dirty containers and outgoing containers for defects using the at least one sensor;
a cleaner within the housing, the cleaner configured to clean containers received from the return port;
a filler within the interior of the housing configured to add fluid to one or more containers;
a capper within the interior of the housing, the capper configured to cap at least one container;
a dispenser configured to receive at least one capped container filled with fluid, the dispenser configured to be accessible from the exterior of the housing; and pick and place technology configured to move containers within the housing.

2. The dispensing machine as defined by claim 1 further comprising storage within the interior of the housing, the storage being configured to hold at least one container.

3. The dispensing machine as defined by claim 2, the storage being configured to receive clean bottles from the cleaner and be accessible to the filler.

4. The dispensing machine as defined by claim 1 further comprising a user interface configured to dispense at least one container in response to user input.

5. The dispensing machine as defined by claim 1 wherein the dispenser comprises logic configured to store data relating to use of the dispensing machine, the data including data specific to individuals and aggregate data of multiple users.

6. The dispensing machine as defined by claim 1 wherein at least one of the containers comprises indicia to enable tracking of the at least one container.

7. The dispensing machine as defined by claim 1 wherein the cleaner is configured to sanitize bottles.

8. The dispensing machine as defined by claim 1 wherein the fluid is a liquid.

9. The dispensing machine as defined by claim 1 wherein the machine is responsive to logic exterior to the housing.

10. The dispensing machine as defined by claim 1 further comprising an outgoing inspection system to inspect outgoing clean containers to meet prescribed requirements.

11. The dispensing machine as defined by claim 1 wherein the inspection system has logic configured to discard containers determined to have defects.

12. The dispensing machine as defined by claim 1 further comprising:
a proximity sensor configured to detect a consumer approaching the machine and logic to initiate an indicia that the machine awaits consumer input.

13. The dispensing machine as defined by claim 1 further comprising an internal dirty container station within the housing configured to drain remaining fluid from uncleaned containers.

14. The dispensing machine as defined by claim 1 further comprising a clean container storage area in the housing configured to store at least two unfilled cleaned containers such that the at least two cleaned containers do not contact each other.

15. The dispensing machine as defined by claim 1 wherein the capper is configured to cap at least one container based on a user profile.

16. The dispensing machine as defined by claim 1, further comprising an acoustic sensor to utilize acoustic data while containers are one of dispensed or returned.

17. The dispensing machine as defined by claim 1, wherein stored containers do not contact each other.

18. The dispensing machine as defined by claim 1, further comprising an Internet of Things (IoT) function to communicate between other dispensing machines managed by a same entity.

19. The dispensing machine as defined by claim 1, wherein the inspection system discards or recycles the container in response to the container fails the inspection and provides a new container to the user.

20. A dispensing machine comprising:
a housing having an interior and exterior;
a return port accessible from the exterior of the housing and configured to receive containers;
an inspection system comprising at least one sensor and logic to inspect incoming dirty containers for defects using the at least one sensor;
a cleaner within the housing, the cleaner configured to clean containers received from the return port;
a dryer within the housing, the dryer configured to dry containers received from the cleaner;
a storage area within the housing, the storage area configured to store containers received from the dryer;
a filler within the interior of the housing configured to add fluid to one or more containers;
a capper within the interior of the housing, the capper configured to cap at least one container;
a dispenser configured to receive at least one capped container filled with fluid, the dispenser configured to be accessible from the exterior of the housing; and
pick and place technology configured to move containers within the housing between the cleaner, the dryer, and the storage area.

21. The dispensing machine as defined by claim 20, further comprising a cap port configured to accept returned caps from users and move returned caps to a recycle bin.

22. The dispensing machine as defined by claim 20, further comprising a scale to verify a weight of the container before the container is dispensed.

* * * * *